(12) United States Patent
Geoghegan et al.

(10) Patent No.: US 6,986,461 B1
(45) Date of Patent: Jan. 17, 2006

(54) ONLINE ENROLLMENT TOOL

(75) Inventors: Jennifer Ann Geoghegan, West Paterson, NJ (US); Joshua A. Melzer, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 187 days.

(21) Appl. No.: 10/609,844

(22) Filed: Jun. 30, 2003

Related U.S. Application Data

(60) Provisional application No. 60/467,071, filed on May 1, 2003.

(51) Int. Cl.
*G06K 5/00* (2006.01)

(52) U.S. Cl. ...................................... 235/382; 235/380

(58) Field of Classification Search ................ 235/380, 235/375, 381, 383, 384, 493, 492, 382; 705/40, 705/41, 43, 44, 64, 51, 76
See application file for complete search history.

(56) References Cited

U.S. PATENT DOCUMENTS

| | | | |
|---|---|---|---|
| 6,332,134 B1 * | 12/2001 | Foster | 705/39 |
| 6,776,332 B2 * | 8/2004 | Allen et al. | 235/380 |
| 2003/0212904 A1 * | 11/2003 | Randle et al. | 713/200 |
| 2003/0236751 A1 * | 12/2003 | Settle | 705/51 |
| 2004/0054579 A1 * | 3/2004 | Lamb et al. | 705/14 |
| 2004/0117321 A1 * | 6/2004 | Sancho | 705/76 |
| 2004/0124246 A1 * | 7/2004 | Allen et al. | 235/492 |
| 2004/0181453 A1 * | 9/2004 | Ray et al. | 705/16 |

* cited by examiner

*Primary Examiner*—Thien M. Le
(74) *Attorney, Agent, or Firm*—McDermott Will & Emery LLP

(57) ABSTRACT

A system and method for facilitating a customer's online enrollment in a promotional reward program by submitting account information, such as, an account code and an identification number. The method may include the steps of receiving account information, validating the account information, verifying the eligibility of the account for the program and enrolling eligible accounts. The method may be executed on a computer system including a data input device, a processing device, a display device and a database.

20 Claims, 1 Drawing Sheet

ONLINE ENROLLMENT TOOL

CROSS REFERENCE TO RELATED APPLICATIONS

The present application claims the benefit of U.S. Provisional Application No. 60/467,071, filed May 1, 2003.

TECHNICAL FIELD

The present subject matter relates to a tool for facilitating enrollment in a promotional reward program. More specifically, the tool facilitates a customer's online enrollment in a promotional reward program by submitting account information, such as, an account code and an identification number.

BACKGROUND

It is often desirable to provide reward programs to customers. For example, a transaction card company may benefit by rewarding a customer for making a purchase using a transaction card, such as a charge card or credit card, issued by the company. In one example, the company may reward the customer by adding airline miles to the customer's frequent flier account as part of a reward program. Reward programs may be long-term, short-term, broad-based or targeted promotions and may include eligibility restrictions.

Enrolling a customer in a frequent flyer reward program, for example, typically involved receiving the frequent flyer account information from the customer and manually verifying the status of the customer's account, determining the customer's eligibility for the reward program and enrolling the customer in the program, if appropriate. The manual process increased the cycle time to enroll a customer in a reward program and to credit the customer's account. As a result, managing enrollment in a reward programs was burdensome.

SUMMARY

The present subject matter relates to a tool for facilitating online enrollment in a promotional reward program by a customer using an account code and an identification number.

An objective is to automate enrollment procedures that had previously been performed manually.

Another objective is to provide an efficient management tool for reward program enrollment.

A further objective is to improve cost control and consumer self-servicing for enrollment in promotional programs.

Still another objective is to facilitate providing specific offers to targeted customers.

Another objective is to enable real-time validation of a customer's eligibility in a reward program.

Yet another objective is to provide a cost effective, flexible and reusable process for managing enrollment in promotional programs.

Another objective is to facilitate targeted promotional programs.

A further objective is to reduce the cycle time for crediting incentives to a customer's account.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWING

The drawing FIGURES depict one or more implementations in accord with the present concepts, by way of example only, not by way of limitations. In the FIGURES, like reference numerals refer to the same or similar elements.

DETAILED DESCRIPTION

Figure 1:
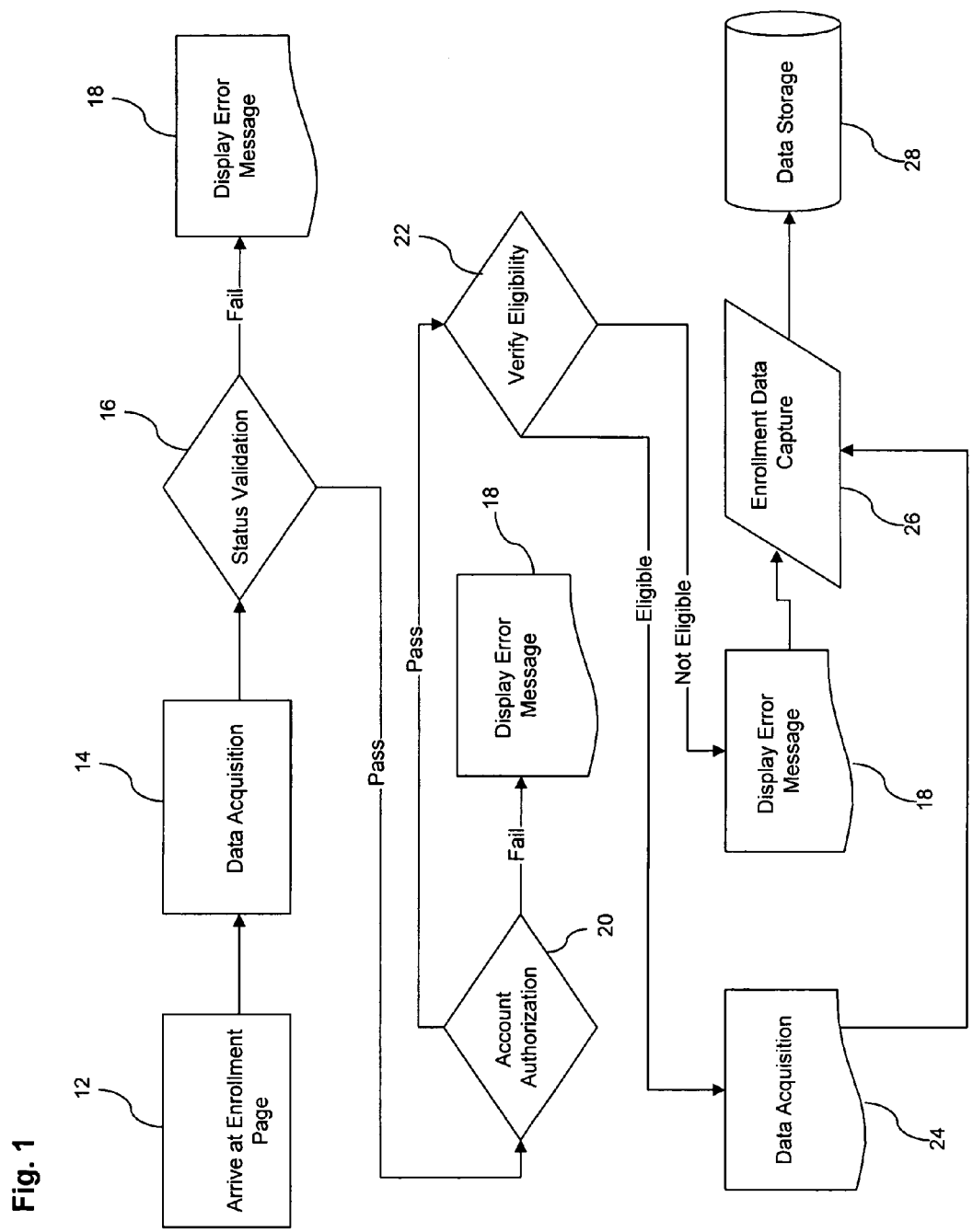
FIG. 1 illustrates a flow chart of an online enrollment process.

Referring now to FIG. 1, one example of an enrollment process 10 is shown. FIG. 1 is an operational flow chart illustrating the steps followed in the enrollment process 10. In the embodiment illustrated in FIG. 1, a cardholder may enroll in a promotional offer or program via the enrollment process 10. The cardholder has been issued a card having an account code and an identification code that are associated with a frequent flyer account number. The enrollment process 10 can be run on a computer system (not shown) which runs software that controls data acquisition, data processing, data transmission and data storage.

As described herein, many of the functions relating to the enrollment process 10 are implemented on a computer or computers, which of course may be connected for data communication via components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the steps shown in the flow charts of FIG. 1) involve programming of software, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the enrollment process 10, in essentially the manner performed in the embodiments discussed and illustrated herein.

As used herein, terms such as computer or machine readable medium refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

In the embodiment of the enrollment process 10 shown in FIG. 1, the cardholder accesses an enrollment page, known as a splash or landing page, via an arrive at enrollment page step 12. The enrollment page may be a web page the cardholder accesses through the Internet. The enrollment page may further be a secure web site to ensure the enrollment process 10 is carried out in a secure environment.

The enrollment page prompts the cardholder to enter the account code and the identification code relating to a particular transaction card account via a data acquisition step 14, as shown in FIG. 1. In the embodiment shown in FIG. 1, the account code is a fifteen byte or digit account code located on the face of the cardholder's card. Similarly, the identification code is a four byte or digit number located on the face of the cardholder's card. Alternatively, the enrollment page may prompt the cardholder to enter alternative or additional information via the data acquisition step 14, such as, for example, the cardholder's name, address, e-mail address, etc. Moreover, the account code and the identification code may be other lengths as will be apparent to one with ordinary skill in the art.

After the cardholder has input the account code and identification code via the data acquisition step 14, the status of the account code is validated via a status validation step 16, as shown in FIG. 1. During the status validation step 16, a script behind the enrollment page performs a validation check of the account code and identification code entered by the cardholder via the data acquisition step 14. The validation check may include, for example, determining whether the account code and the identification code are the proper length, whether the account code and the identification code entered consist only of numeric characters and whether the account code is a valid account number.

If the account code and identification code do not pass the validation check, a pop-up window appears on the cardholder's display, via a display error message step 18, providing an appropriate error message to the cardholder and prompting the cardholder to return to the enrollment page and reenter the data via the data acquisition step 14. The error message may further include a description of the type of error that occurred during the validation check. For example, the error message may inform the cardholder that the account code entered via the data acquisition step 14 is not the proper length. If a cardholder submits three consecutive invalid account codes via successive entries through the data acquisition step 14, the enrollment process may be terminated. The cardholder may be redirected to a frequently asked questions page at the termination of the enrollment process 10, as described further below.

If the account code and identification code pass the validation check, the enrollment process then determines whether the account code and the identification code are properly associated via an account authorization step 20. The associated of the account code and the identification code may be provided to the cardholder and verified via the account authorization step 20 as described in U.S. Pat. No. 6,182,894, the entirety of which is incorporated herein by reference. The authorization step 20 may be used to verify that the cardholder is in possession of the card when entering the account code and identification code via the data acquisition step 14.

If the account authorization step 20 determines the account code and the identification code do not match, a pop-up window appears on the cardholder's display via the display error message step 18. The window provides an appropriate error message to the cardholder and prompting the cardholder to return to the enrollment page and reenter the account code via the data acquisition step 14. The error message may further include a description of the type of error that occurred during the validation check. For example, the error message may inform the cardholder that the account code and the identification code entered via the data acquisition step 14 do not match. If a cardholder submits three consecutive invalid account codes via successive entries through the data acquisition step 14, the enrollment process 10 may be terminated. The cardholder may be redirected to a frequently asked questions page at the termination of the enrollment process 10, as described further below.

If the account code passes the account authorization step 20, the online process 10 next determines whether the account code provided by the cardholder in the data acquisition step 14 is eligible for enrollment via a verify eligibility step 22. When providing a targeted offer or promotion to customers, it may be desirable to restrict enrollment eligibility to predetermined cardholders. Therefore, a database of eligible account codes may be provided for determining a cardholder's eligibility in a given promotion or offer. Alternatively, the account code or other cardholder information may be used to determine a cardholder's eligibility. For example, eligibility may be determined with reference to the cardholder's address. Accordingly, the verify eligibility step 22 may include cross-checking the account code entered via the data acquisition step 14 with the database of valid promotional codes.

If the verify eligibility step 22 determines the account code is eligible for the promotion or offer, the enrollment process 10 proceeds to a thank you page display step 24, as shown in FIG. 1. The thank you page display step 24 provides the cardholder positive feedback informing the cardholder the cardholder's account has been enrolled in the promotion or offer. When the cardholder closes the thank you page, the cardholder may be redirected to an offers page whereby access to the enrollment page is provided.

If the verify eligibility step 22 determines the account code account code is not eligible for the promotion or offer, a pop-up window appears on the cardholder's display via the display error message step 18 and the enrollment process 10 is terminated. The pop-up window provides an appropriate error message to the cardholder. For example, the error message may inform the cardholder that the account code is not eligible for the promotion or offer.

If the cardholder manually closes any of the web pages at any point during the enrollment process 10, the enrollment process 10 may be terminated. The cardholder may be redirected to a frequently asked questions page at the termination of the enrollment process 10.

The frequently asked questions page discussed above with reference to the error message step 18 may provide a list of common questions that may arise during the enrollment process 10 as well as answers to those questions. The frequently asked questions page may further include hyperlinks for returning to the offers page, the enrollment page or another web site as will be apparent to one with ordinary skill in the art. The frequently asked questions page may further include customer service contact information.

All of the enrollment data input or generated during the enrollment process is automatically captured via an enrollment data capture step 26. The enrollment data may include the data provided by the cardholder via the data acquisition step 14, as well as any data generated by the enrollment process 10, such as, for example, whether a cardholder terminated the enrollment process 10 manually. The captured data may then be transferred to a system storage database via a data storage step 28 whereby eligible accounts are enrolled in the promotional program. The captured data may be electronically transferred to the storage database and may be maintained in the database for any period of time. For example, it may be appropriate to purge the database of enrollment information at the end of a promotional period or it may instead be appropriate to maintain the storage of the captured data for cardholder and/or promotional analysis. It may also be appropriate to save successful registration information in a separate storage database for permanent or semi-permanent storage while saving other feedback in a temporary storage database. In addition, the enrollment data may be captured and sent, in real-time, to a customer service database to provide customer service representatives the information necessary to handle customer questions regarding enrollment status or other enrollment questions. Further, a confirmation e-mail may be sent to the cardholder to verify or confirm enrollment status.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

We claim:

1. A method of using a computer for online enrollment of a transaction cardholder's account in a promotional program comprising the steps of:
    receiving cardholder account information;
    validating said cardholder account information, wherein validating said cardholder account information includes determining whether said cardholder account information is properly formatted;
    verifying eligibility of cardholder account in the promotional program; and
    storing said cardholder account information in a database whereby eligible cardholder accounts are enrolled in the promotional program.

2. The method of claim 1 wherein said cardholder account information includes cardholder identification information.

3. The method of claim 2 wherein said cardholder identification information includes a transaction card number and an identification code.

4. The method of claim 3 further comprising the step of verifying said identification code matches said transaction card number.

5. The method of claim 1 further comprising the step of verifying said cardholder account information matches a valid cardholder account.

6. The method of claim 1 further comprising the step of informing a cardholder in real-time whether the cardholder's account has been enrolled in the promotional program.

7. A method for enrolling an account in a program comprising the steps of:
    receiving account information;
    validating said account information, wherein validating said account information includes determining whether said account information is properly formatted;
    verifying eligibility of account in the program; and
    storing said account information in a database whereby eligible accounts are enrolled in the program.

8. The method of claim 7 wherein said account information includes an account number and an identification code.

9. The method of claim 8 further comprising the step of verifying said identification code matches said account number.

10. The method of claim 7 further comprising the step of verifying said account information matches a valid account.

11. The method of claim 7 further comprising the step of displaying in real-time whether the account has been enrolled in the program.

12. A computer system for online enrollment in a reward program comprising:
    a data input device for receiving enrollment information input by a user;
    a processing device coupled to said data input device for determining whether said enrollment information is properly formatted and determining whether said enrollment information qualifies for the promotional program;
    a display device coupled to said data input device for informing the user whether said enrollment information qualifies for the promotional program; and
    a database coupled to said processing device for storing said enrollment information.

13. The system of claim 12 wherein said processing device is coupled to said data input device via a computer network.

14. The system of claim 13 wherein said computer network is the Internet.

15. The system of claim 12 wherein said enrollment information includes a transaction card number and an identification code.

16. The system of claim 12 further comprising a data storage device coupled to said processing device wherein said data storage device contains additional data to be used for determining whether said enrollment information qualifies for the promotional program.

17. The method of claim 1 wherein determining whether said cardholder account information is comprised of a predetermined number of alpha-numeric characters.

18. The method of claim 1 wherein determining whether said cardholder account information is properly formatted includes determining whether said cardholder account information includes a valid transaction card account number.

19. The method of claim 7 wherein determining whether said account information is comprised of a predetermined number of alpha-numeric characters.

20. The method of claim 7 wherein determining whether said account information is properly formatted includes determining whether said account information includes a valid account number.

\* \* \* \* \*